Patented Feb. 16, 1954

2,669,552

UNITED STATES PATENT OFFICE 2,669,552

ACID-CATALYZED FURFURYL ALCOHOL RESIN BONDING MATERIAL

Raymond B. Seymour, Emmaus, and Robert P. Desch, Allentown, Pa., assignors to The Atlas Mineral Products Company of Pennsylvania, Mertztown, Pa., a corporation of Pennsylvania No Drawing. Application October 18, 1951,
Serial No. 251,994

2 Claims. (Cl. 260—37)

The present invention relates to an acid and alkali resistant bonding material adapted for use in cementing tiles in floors and for cementing joints and the like.

It is known that partially converted phenolic resins can be converted to a solid cement by the use of an inert powder containing an acid such as disclosed in U. S. Patent 2,252,331. It is also disclosed in U. S. Patent 2,398,361 that sulfamic acid will cure phenolic resins. However, it is impractical to cure phenolic resins or liquid furfuryl alcohol type resins at low temperatures, for example 40° F., regardless of the amount of sulfamic acid used.

Another objection to the present furfuryl alcohol and phenolic cements is that they have too short a working time in the mortar form, and if this time is extended through reduction of catalyst, the setting rate at ordinary temperatures is too slow and oftentimes they will not set at all at temperatures such as 40° F. which are normally encountered in outside construction work during winter months. Para-toluene sulfonic acid and para-toluene sulfonyl chloride are often used as catalysts to increase the setting rate of these resins. These acids are used in small amounts, for example 2 to 4%, in a powder which is added to the resin, and since the amount of acid is critical, a small amount of contamination, such as the addition of 0.5% Portland cement will prevent the mortar from setting.

It is an object of this invention to provide a cement mortar which at low temperatures, such as 40° F., will be converted to an infusible material.

A further object of this invention is to provide a cement mortar which is resistant to alkalis and acids.

The methods of producing liquid phenol formaldehyde products are well known and the products are usually prepared by the reaction of formaldehyde with phenol in the presence of a catalyst. The methods of producing furfuryl alcohol polymers are also known and they are usually prepared by the reaction of furfuryl alcohol and formaldehyde. U. S. Patent 2,366,049 describes the use of a bodied furfuryl alcohol for the same purpose. Both the liquid phenolic and liquid furfuryl alcohol resins can be cured at room temperature with acids having an ionization constant of $1.4 \times 10^{-4}$ or higher.

The composition of the present invention which is added to a synthetic resin to form a cement mortar comprises a powder containing a finely divided inert material such as barium sulfate, silica, carbon, asbestos, or other similar finely divided inert materials or mixtures thereof with an active catalyst for the resin and sulfamic acid. The active catalyst is an acidic material, for example, sulfuric acid, sodium bisulfate, para-toluene sulfonic acid, an alkane sulfonic acid having two to fourteen carbon atoms and para-toluene sulfonyl chloride.

In preparing the cement mortar of the present invention, the inert material is mixed with sulfamic acid and the active acid catalyst. When the mortar is to be used on the job, the powder is then mixed with a liquid resin, such as a phenol formaldehyde or furfuryl alcohol formaldehyde polymer and is then applied to the surface to be cemented.

The invention will be further illustrated by the following examples:

EXAMPLE 1

2 parts by weight of a carbon powder to which was added various amounts of acids was mixed with 1 part by weight of a liquid resin prepared by heating seventy-five parts furfuryl alcohol with twelve parts formaldehyde in the presence of one part phosphoric acid. The resultant mass was neutralized. The working time of the mortars, the titre with 0.1 normal sodium hydroxide and the setting time of the mortars, 40° F. and 80° F., are given in the table below:

| Acid Content, Percent by weight of powder | Titre of Powder (ml. 0.1 N NaOH) | Working Time of Mortar @ 85° F. | Setting Time 40° F. | Setting Time 80° F. | Setting Time in the presence of 1.0% Portland Cement @ 80° F. |
|---|---|---|---|---|---|
| 2.0% para-toluene sulfonic acid | 1.5 | 35 min | <10 da | 40 Min | Would not set. |
| 3% para-toluene sulfonic acid | 2.2 | 9 min | 4 da | 10 Min | Do. |
| 3.5% para-toluene sulfonic acid | 2.6 | 2 min | 2 da | 5 Min | Do. |
| 4.0% sulfamic acid | 4.0 | 20 hrs | Did not set | 1 da | Did not set. |
| 8.0% sulfamic acid | 8.0 | 12 hrs | do | 18 hrs | 2 da. |
| 2.0% para-toluene sulfonic acid+8% sulfamic acid | 9.6 | 21 min | 4 da | 23 min | 6 hrs. |
| 1.0% sulfuric acid | | | | | |
| 1.0% sulfuric acid+8.0% sulfamic acid | 3.5 | 90 min | Did not set | 3–4 hrs | Did not set. |
| 1.6% butane sulfonic acid | 11.5 | 21 min | 3 da | 25 min | 7 hrs. |
| 1.6% butane sulfonic acid+8.0% sulfamic acid | 1.7 | 45 min | 5 da | 90 min | Did not set. |
| 5% sodium bisulfate | 9.7 | 20 min | 4 da | 25 min | 4 hrs. |
| 2% sodium bisulfate; 1.5% para-toluene sulfonic acid | 4.0 | 18 min | Did not set | 2 hrs | Did not set. |
| 5% sodium bisulfate, 8% sulfamic acid | 3.5 | 5 min | 4 da | 6 hrs | Do. |
| 4.0% para-toluene sulfonyl chloride | 12.0 | 30 min | 3 da | 36 min | 40 min. |
| 4.0% para-toluene sulfonyl chloride; 8.0% sulfamic acid | | 80 min | 5 da | 85 min | Did not set. |
| | | 81 min | 3 da | 85 min | 3 hrs. |

An examination of these data will show that in spite of the fact that the presence of sulfamic acid gave a reserve of acidity to counteract contamination such as encountered in actual practice when the cements are used for the jointing of brick and tile, the presence of sulfamic acid increased the working life of the cement and shortened the setting time. However, as shown by the data, sulfamic acid alone is not satisfactory at 40° F. It might be expected that high concentrations of sulfamic acid would cause an increased water absorption. Actually, the presence of 5% sodium bisulfate in the mortar caused an addition of 5% water absorption whereas the addition of 8% sulfamic acid did not increase the water absorption to any significant degree. For example, a mortar containing 2.4% para-toluene sulfonic acid when allowed to set and immersed in water for 15 days at 60° C. and dried with absorbent paper showed an increase in weight of 0.84%. When a mortar containing 2.4% para-toluene sulfonic acid and 10% sulfamic acid was tested in the same manner, the gain in weight was only 0.53%. It may be reasoned that the presence of sulfamic acid would reduce the corrosion resistance of such a cement but actually the corrosion resistance was increased. For example, when the cement made from a mortar containing 2.4% para-toluene sulfonic acid was immersed in 5% nitric acid for 7 days at 60° C., it lost 3.1% of its weight. A test on a cement made from a mortar containing 2.5% para-toluene sulfonic acid and 6% sulfamic acid showed a loss in weight of only 0.5% when immersed in 5% nitric acid for 7 days at 60° C.

One of the difficulties experienced with cements based on para-toluene sulfonic acid, para-toluene sulfonyl chloride or combinations of these materials with sodium bisulfate is that a change in the ratio of powder to liquid causes a reduction in the setting time to a point where these materials are not practical. For example, a mortar made by mixing a polymer of furfuryl alcohol in a ratio of 1 to 1 by weight with finely divided carbon containing 2% para-toluene sulfonic acid did not set at 50° F., whereas changes in the ratio with a powder containing 2% para-toluene sulfonic acid and 8% sulfamic acid when mixed with a liquid furfuryl alcohol resin in the ratio of 2 to 1 had a setting time of approximately 1 day at 60° F., and even when mixed in a ratio of 1 to 1, set in less than 2 days at 60° F.

EXAMPLE 2

A silica powder containing 1.6% by weight para-toluene sulfonic acid and 6% by weight sulfamic acid was used to set a phenolic resin using a ratio of powder to liquid of 5 to 2. This mortar had a working life of 14 minutes at 85° F. and set in the presence of as much as 3% Portland cement.

EXAMPLE 3

A barium sulfate powder containing 4% by weight para-toluene sulfonyl chloride and 8% by weight sulfamic acid was used to set a furfuryl alcohol-formaldehyde resin using a ratio of powder to liquid of three to two. This mortar had satisfactory working and setting times throughout the temperature range of 60 to 90° F.

EXAMPLE 4

Cast articles were made from a mortar prepared by the addition of one part by weight of an asbestos powder containing 10% by weight sodium bisulfate and 16% by weight sulfamic acid to one part by weight of a furfuryl alcohol-furfural resin at room temperature.

It will be appreciated by those skilled in the art that many modifications are possible within the scope of the present invention, and the invention is to be restricted only in accordance with the appended claims.

What is claimed is:

1. A mortar comprising a furfuryl alcohol resin, and a powder including a finely divided inert filler, 2 to 10% by weight sulfamic acid and acidic material selected from the group consisting of 0.3 to 3% by weight sulfuric acid, 1.5 to 7% by weight sodium bisulfate, 1.5 to 6% by weight para-toluene sulfonyl chloride and 0.75 to 4% by weight of an alkane sulfonic acid having two to fourteen carbon atoms, the ratio of powder to resin being in the range of from 2.5 to 1 to 1 to 1 by weight.

2. A mortar comprising a furfuryl alcohol-formaldehyde resin, and a powder including a finely divided inert filler, 2 to 10% by weight sulfamic acid and acidic material selected from the group consisting of 0.3 to 3% by weight of sulfuric acid, 1.5 to 7% by weight sodium bisulfate, 1.5 to 6% by weight para-toluene sulfonyl chloride and 0.75 to 4% by weight of an alkane sulfonic acid having two to fourteen carbon atoms, the ratio of powder to resin being in the range of from 2.5 to 1 to 1 to 1 by weight.

RAYMOND B. SEYMOUR.
ROBERT P. DESCH.

References Cited in the file of this patent

UNITED STATES PATENTS

| Number | Name | Date |
|---|---|---|
| 2,201,762 | Cupery | May 21, 1940 |
| 2,398,361 | Daniels | Apr. 16, 1946 |
| 2,455,159 | Brenner et al. | Nov. 30, 1948 |
| 2,471,600 | Adams et al. | May 31, 1949 |

OTHER REFERENCES

Divers and Hago, Journal of the Chemical Society, (London) vol 69, page 1640 (1896).